April 26, 1949.                M. WATTER                    2,468,647
              ELECTRODE TIP CONSTRUCTION FOR WELDING APPARATUS
                            Filed May 22, 1947

INVENTOR.
                                          Michael Watter.
                                      BY
                                              ATTORNEY.

Patented Apr. 26, 1949

2,468,647

UNITED STATES PATENT OFFICE 2,468,647

ELECTRODE TIP CONSTRUCTION FOR WELDING APPARATUS

Michael Watter, Philadelphia, Pa., assignor to The Budd Company, Philadelphia, Pa., a corporation of Pennsylvania Application May 22, 1947, Serial No. 749,659

5 Claims. (Cl. 219—4)

This invention relates to electrodes as employed in spot resistance welding.

The electrode in common use in spot resistance welding, is circular in cross section at the tip, producing a weld nugget in the welding operation of circular formation. In a welded structure, as for example, two metal plates welded together, it has been found that because of peeling stresses formed at various welds between the plates, the welds frequently yield at a point in the weld formed by the intersection of the middle line of stress and the circumference of the weld, and that failure at this point then results in progressive further failure at other portions of the weld. This action explains weld fatigue failure as well and is the result of constant repetition of peeling stresses at the point mentioned in the weld circumference.

A primary object of the invention is to provide a weld formation which has greater resistance to the repeated peeling stresses active at a weld than can be achieved with a circular weld.

Still another object is to provide an electrode tip shape which in welding uses develops a substantially rectilinear bounding edge for the weld substantially transverse to the principal lines of stresses between the plates or sections of the workpiece at the weld.

Other objects of the invention pertain to improvement in the efficacy of spot resistance electrodes and in the type of weld produced, thereby providing greater resistance to rupture of the welded structure.

Figure 1:
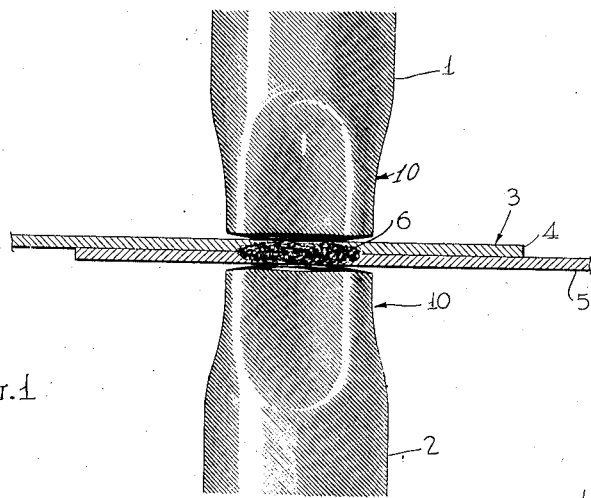
Figure 1 is a view in elevation of two coacting electrodes having the tips of the invention and applied to two plates as a workpiece, with the plates and nugget in section.
Figure 2:
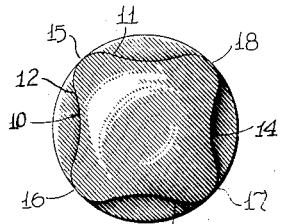
Figure 2 is an end view of one of the electrodes.

Experimental investigation has determined that the disruption of a weld subject to recurrent peeling stresses is frequently due to concentration of these stresses at a limited area in the weld in line with the stresses. Consequently, where the tip section is circular in outline, the stresses are unduly concentrated at a single point along the circumference of the nugget. Hence, by altering the shape of the electrode tip so that the weld stresses are distributed along a line instead of concentrated at a point, the fatigue or deterioration resulting from repeated stresses is reduced. Ideally, a weld edge which is rectilinear in shape and at right angles to the line of stresses is desirable. Such a bounding edge for the weld is secured by making the weld tip so that the edge normally placed at right angles to the stresses is substantially rectilinear but with the terminal points of the straight edge protruded and rounded so as to produce foliated projections.

Referring to the drawing, there are shown two electrodes 1 and 2, positioned in alignment and adapted for engagement of the workpiece 3 formed of plates 4 and 5. Fusion by the welding operation produces the nugget 6 shown in section.

In the example of the drawing, a substantially square shaped tip 10 is shown, giving four side edges 11, 12, 13 and 14 with protruding and rounded projections 15, 16, 17 and 18 at the angles to produce in section an outline having an undulating contour with uniform rounded projections at the angles resulting in concavity in the side edges.

Figure 3:
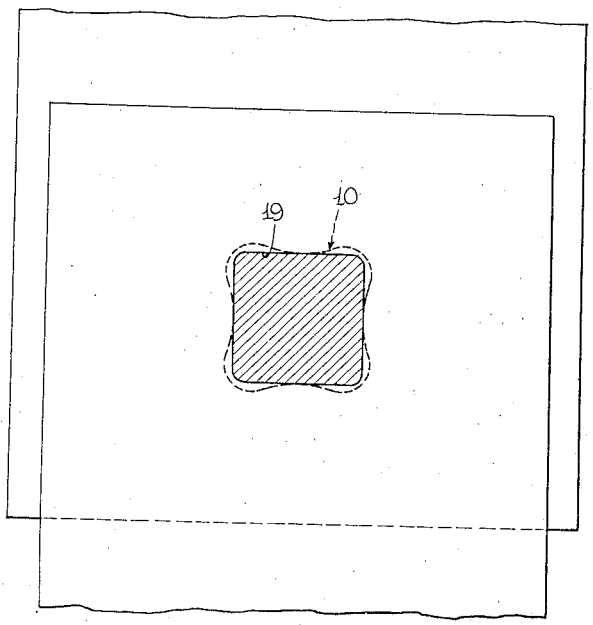
Figure 3 is a view showing the two superimposed plates in plan with the electrode tip in broken line and the nugget in full line.

The purpose of the protruding and rounded projections 15, 16, 17 and 18, at the angles, is to control the current density within sheets to be welded so as to achieve a substantially square weld. A simply square cross section electrode will not produce the desired effect because of the decrease in current density within the parts corresponding to the corners of the electrode cross section. The foliated formation as illustrated, tends to produce a nugget substantially square in outline as indicated by the numeral 19 in Fig. 3.

The square shaped tip is shown and described as preferable for ordinary welding operations. However, it is apparent that the shape of the tip need not necessarily be limited to a strictly square shape, the essential requirement being that for a given weld at the edge of the nugget which is subjected to peeling stresses, the nugget edge should be transversely linear. Hence the tip structure may be broadly triangular or in general polygonal in outline, provided only they be designed to produce a weld nugget having a substantially rectilinear edge at substantially a right angle to the principal lines of stress. To approximate the desired rectilinear edge shape, it is desirable that the angled sections be extended and rounded at least where they mark the end of the stress line, as discussed above.

The electrode tip as described may employ any of the metals ordinarily used for this purpose, there being no restrictions on the type or composition of electrode. The tip is shown as integral with the stem of the electrode but obviously it may be separable and in use attached to the stem.

Other modifications within the scope of the claims will be apparent.

What is claimed is:

1. An electrode for electrical resistance welding comprising an electrically conductive stem, and a tip fixed to the end thereof, said tip having in cross section substantially the shape of a square, the corners of the square being symmetrically protruded and rounded and forming with the sides intervening concavities.

2. An electrode for electrical resistance welding comprising an electrically conductive stem, and a tip secured to the stem end, said tip having in cross section the form of a square with uniformly depressed sides forming concavities in the generally square shape.

3. An electrode for electrical resistance welding comprising an electrically conductive stem, and a tip secured to the stem end, said tip having in cross section the general form of a polygon with the angles uniformly protruded and curved.

4. An electrode for electrical resistance welding comprising an electrically conductive stem, and a tip secured to the stem end, said tip having in cross section the general form of a polygon with the angles at the ends of at least one weld edge line being outwardly projected and enlarged.

5. An electrode for electrical resistance welding comprising an electrically conductive body having a work-engaging portion which is convex toward the workpiece in a plane perpendicular to the workpiece and which in a plane generally parallel to the workpiece has the shape of a polygon with concave sides and rounded corners.

MICHAEL WATTER.

REFERENCES CITED

The following references are of record in the file of this patent:

UNITED STATES PATENTS

| Number | Name | Date |
| --- | --- | --- |
| 1,303,919 | Lachman | May 20, 1919 |